US012731239B2

(12) United States Patent
Kolchin et al.

(10) Patent No.: US 12,731,239 B2
(45) Date of Patent: Sep. 8, 2026

(54) DIGITAL NONLINEAR NEURAL NETWORK BASED IMAGE FILTERING FOR SEMICONDUCTOR APPLICATIONS

(71) Applicant: KLA Corporation, Milpitas, CA (US)

(72) Inventors: Pavel Kolchin, Livermore, CA (US); Martin Plihal, San Francisco, CA (US); Yuping He, Fremont, CA (US)

(73) Assignee: KLA Corporation, Milpitas, CA (US)

( * ) Notice: Subject to any disclaimer, the term of this patent is extended or adjusted under 35 U.S.C. 154(b) by 43 days.

(21) Appl. No.: 18/622,602

(22) Filed: Mar. 29, 2024

(65) Prior Publication Data

US 2025/0225638 A1 Jul. 10, 2025

Related U.S. Application Data

(60) Provisional application No. 63/618,938, filed on Jan. 9, 2024.

(51) Int. Cl.
*G06T 7/00* (2017.01)

(52) U.S. Cl.
CPC .. *G06T 7/0004* (2013.01); *G06T 2207/20024* (2013.01); *G06T 2207/20084* (2013.01); *G06T 2207/30148* (2013.01)

(58) Field of Classification Search
CPC ......... G06T 7/0004; G06T 2207/20024; G06T 2207/20084; G06T 2207/30148; G06T 2207/10061; G06T 2207/20081
See application file for complete search history.

(56) References Cited

U.S. PATENT DOCUMENTS 8,126,255 B2 2/2012 Bhaskar et al.
8,664,594 B1 3/2014 Jiang et al.
8,692,204 B2 4/2014 Kojima et al.
8,698,093 B1 4/2014 Gubbens et al.
8,716,662 B1 5/2014 MacDonald et al.
9,222,895 B2 12/2015 Duffy et al.
2017/0351952 A1* 12/2017 Zhang .................... G06T 7/001
2018/0075594 A1 3/2018 Brauer
2019/0073568 A1* 3/2019 He .......................... G06T 7/001
2019/0303717 A1* 10/2019 Bhaskar ................ G06T 7/0004
2019/0378293 A1* 12/2019 Mwikirize ........... G06N 3/0464
2021/0125325 A1* 4/2021 Huang ...................... G06T 5/70
(Continued)

FOREIGN PATENT DOCUMENTS

WO 2020-146163 7/2020
WO 2020-210178 10/2020

OTHER PUBLICATIONS

International Search Report and Written Opinion for PCT/US2025/010019 mailed Apr. 24, 2025.
(Continued)

*Primary Examiner* — Bobbak Safaipour
(74) *Attorney, Agent, or Firm* — Entropy Matters LLC

(57) ABSTRACT

Methods and systems for determining information for a specimen location are provided. One system includes a computer subsystem configured for inputting one or more images for a specimen location into a region-based neural network configured for performing digital non-linear filtering of the one or more images to thereby generate a filtered image for the specimen location. The computer subsystem is also configured for determining information for the specimen location from the filtered location.

31 Claims, 4 Drawing Sheets

(56) References Cited

U.S. PATENT DOCUMENTS

| | | | | |
|---|---|---|---|---|
| 2021/0334946 | A1 | 10/2021 | Buzaglo | |
| 2023/0408423 | A1 | 12/2023 | Yabbo et al. | |
| 2024/0161270 | A1 | 5/2024 | Kolchin | |
| 2025/0352134 | A1* | 11/2025 | Chang .................. | A61B 5/4576 |

OTHER PUBLICATIONS

Yu et al., "Multi-Scale Context Aggregation by Dilated Convolutions", arXiv:1511.07122, Apr. 30, 2016, 13 pages.

* cited by examiner

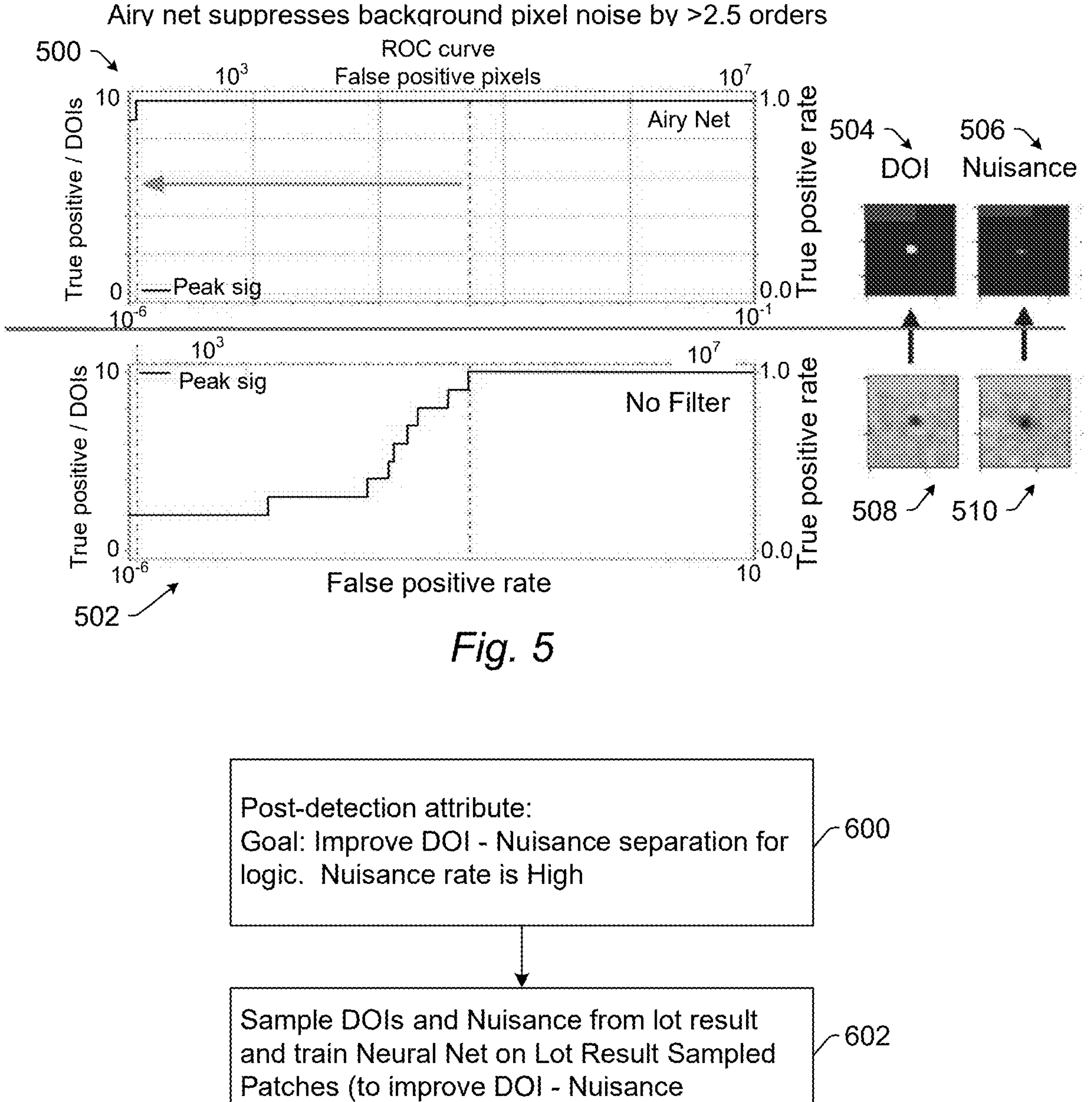

*Fig. 5*

Post-detection attribute:
Goal: Improve DOI - Nuisance separation for logic. Nuisance rate is High

600

Sample DOIs and Nuisance from lot result and train Neural Net on Lot Result Sampled Patches (to improve DOI - Nuisance separation).

602

Run Neural Net on lot result patches, extract attributes (peak signal in defect and noise regions) and use them as attributes for further filtering with a defect classifier.

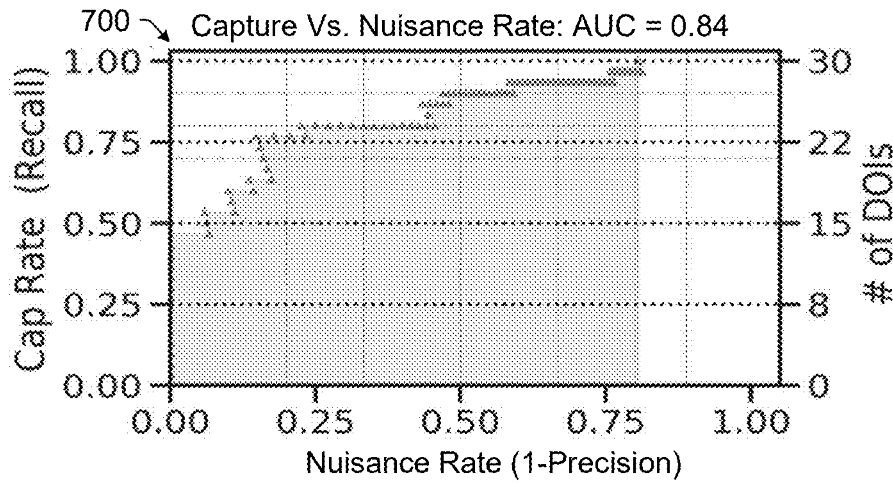
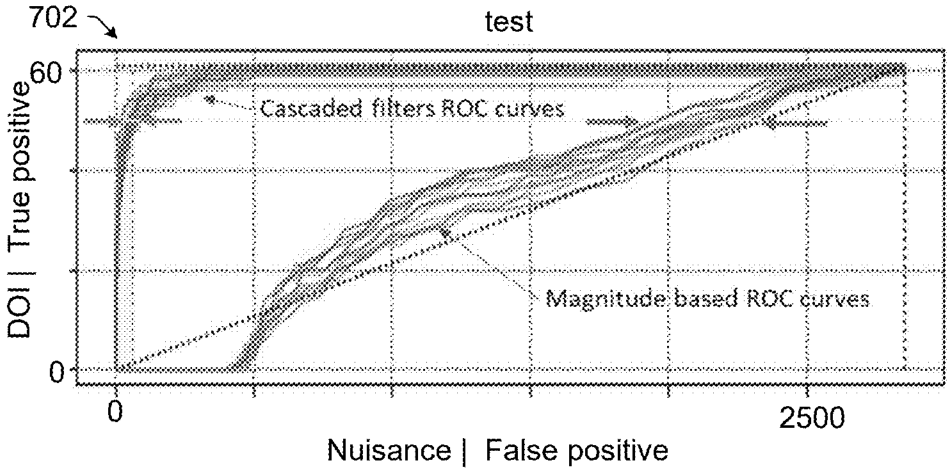
*Fig. 7*
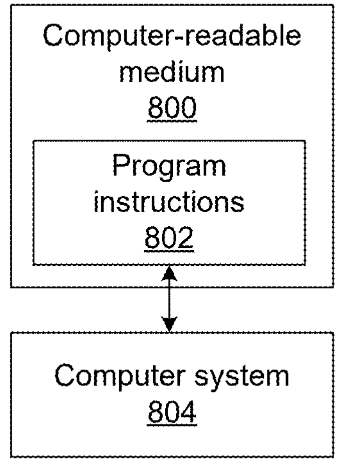
*Fig. 8*

DIGITAL NONLINEAR NEURAL NETWORK BASED IMAGE FILTERING FOR SEMICONDUCTOR APPLICATIONS

BACKGROUND OF THE INVENTION

1. Field of the Invention

The present invention generally relates to methods and systems for determining information for a specimen location. Certain embodiments described herein relate to methods and systems for enhancing defect detection and/or nuisance filtering in optical wafer inspection using digital nonlinear neural network based image filtering.

2. Description of the Related Art

The following description and examples are not admitted to be prior art by virtue of their inclusion in this section.

Fabricating semiconductor devices such as logic and memory devices typically includes processing a specimen such as a semiconductor wafer using a number of semiconductor fabrication processes to form various features and multiple levels of the semiconductor devices. For example, lithography is a semiconductor fabrication process that typically involves transferring a pattern to a resist arranged on a semiconductor wafer. Additional examples of semiconductor fabrication processes include, but are not limited to, chemical-mechanical polishing, etch, deposition, and ion implantation. Multiple semiconductor devices may be fabricated in an arrangement on a semiconductor wafer and then separated into individual semiconductor devices.

Inspection processes are used at various steps during a semiconductor manufacturing process to detect defects on specimens to drive higher yield in the manufacturing process and thus higher profits. Inspection has always been an important part of fabricating semiconductor devices. However, as the dimensions of semiconductor devices decrease, inspection becomes even more important to the successful manufacture of acceptable semiconductor devices because smaller defects can cause the devices to fail.

Defect review typically involves re-detecting defects detected as such by an inspection process and generating additional information about the defects at a higher resolution using either a high magnification optical system or a scanning electron microscope (SEM). Defect review is therefore performed at discrete locations on specimens where defects have been detected by inspection. The higher resolution data for the defects generated by defect review is more suitable for determining attributes of the defects such as profile, roughness, more accurate size information, etc. Defects can generally be more accurately classified into defect types based on information determined by defect review compared to inspection.

Metrology processes are also used at various steps during a semiconductor manufacturing process to monitor and control the process. Metrology processes are different than inspection processes in that, unlike inspection processes in which defects are detected on a specimen, metrology processes are used to measure one or more characteristics of the specimen that cannot be determined using currently used inspection tools. For example, metrology processes are used to measure one or more characteristics of a specimen such as a dimension (e.g., line width, thickness, etc.) of features formed on the specimen during a process such that the performance of the process can be determined from the one or more characteristics. In addition, if the one or more characteristics of the specimen are unacceptable (e.g., out of a predetermined range for the characteristic(s)), the measurements of the one or more characteristics of the specimen may be used to alter one or more parameters of the process such that additional specimens manufactured by the process have acceptable characteristic(s).

Metrology processes are also different than defect review processes in that, unlike defect review processes in which defects that are detected by inspection are re-visited in defect review, metrology processes may be performed at locations at which no defect has been detected. In other words, unlike defect review, the locations at which a metrology process is performed on a specimen may be independent of the results of an inspection process performed on the specimen. In particular, the locations at which a metrology process is performed may be selected independently of inspection results. In addition, since locations on the specimen at which metrology is performed may be selected independently of inspection results, unlike defect review in which the locations on the specimen at which defect review is to be performed cannot be determined until the inspection results for the specimen are generated and available for use, the locations at which the metrology process is performed may be determined before an inspection process has been performed on the specimen.

Methods and systems configured for performing the yield related processes described above are often developed by first finding the best possible hardware configuration for generating images, data, measurements, signals, etc. for the specimens. Once the hardware configuration has been established, parameters of the hardware that are best for the processes are selected. Hardware parameter selection can greatly affect how responsive the images, data, measurements, signals, etc. are to the specimen and how well they can be used for determining information for the specimen.

Sometimes even the best possible hardware configuration and associated parameters are not capable of generating output that is ideal for determining information for a specimen. For example, the best possible hardware configuration and parameters may still produce images that contain a significant amount of noise that can interfere with defect detection, metrology, and defect review. In such cases, the methods and systems may be configured to try to improve the images prior to using them to determine information for the specimen. Many different kinds of post-processing may be performed on the images, data, measurements, signals, etc. generated for a specimen by tool hardware. For example, some broadband optical inspection tools currently use only a limited set of predefined digital linear filter templates.

While post-processing the tool hardware output can often improve the ability to determine information for a specimen, new ways to improve the images, etc. are constantly being explored due to some current existing limitations of the tools/methods and additional challenges expected in the future. For example, the limited set of predefined digital linear filter templates currently used by some tools may not be sufficient to increase the detection sensitivity or to reduce the nuisance rate for challenging inspections and defects. In particular, for relatively small challenging defects, optical signal detection typically occurs at the edge of or below the sensitivity limit of the optical wafer inspection tool, which results in overwhelming noise or nuisance count rate. Available process of record and auto-linear difference image filters often do not provide a satisfactory solution to address the problem of relatively high nuisance or relatively low defect of interest (DOI) capture rates.

Accordingly, it would be advantageous to develop systems and methods for filtering images to determine information for a specimen that do not have one or more of the disadvantages described above.

SUMMARY OF THE INVENTION

The following description of various embodiments is not to be construed in any way as limiting the subject matter of the appended claims.

One embodiment relates to a system configured for determining information for a specimen location. The system includes a computer subsystem configured for inputting one or more images for a specimen location into a region-based neural network configured for performing digital non-linear filtering of the one or more images to thereby generate a filtered image for the specimen location. The computer subsystem is also configured for determining information for the specimen location from the filtered image. The system may be further configured as described herein.

Another embodiment relates to a computer-implemented method for determining information for a specimen location. The method includes the inputting and determining steps performed by the computer subsystem as described above. Each of the steps of the method may be performed as described further herein. The method may include any other step(s) of any other method(s) described herein. The method may be performed by any of the systems described herein.

Another embodiment relates to a non-transitory computer-readable medium storing program instructions executable on a computer system for performing a computer-implemented method for determining information for a specimen location. The computer-implemented method includes the steps of the method described above. The computer-readable medium may be further configured as described herein. The steps of the computer-implemented method may be performed as described further herein. In addition, the computer-implemented method for which the program instructions are executable may include any other step(s) of any other method(s) described herein.

BRIEF DESCRIPTION OF THE DRAWINGS

Further advantages of the present invention will become apparent to those skilled in the art with the benefit of the following detailed description of the preferred embodiments and upon reference to the accompanying drawings in which:

FIG. 5 includes plots illustrating ROC curves showing that the embodiments described herein when used for image filtering suppress the background noise pixels by 2.5 orders for the same true positive values as compared to the non-filtered case;

FIG. 6 is a flow chart illustrating one embodiment of a use case for the image filtering embodiments described herein at a post-detection stage;

FIG. 7 includes examples of plots showing a DOI capture rate versus nuisance rate curve for a wafer after an embodiment of the filtering described herein is applied and a DOI capture rate versus nuisance rate curve after an embodiment of the post-detection filtering described herein is applied on a highly imbalanced data set; and FIG. 8 is a block diagram illustrating one embodiment of a non-transitory computer-readable medium storing program instructions for causing a computer system to perform a computer-implemented method described herein.

Figure 1:
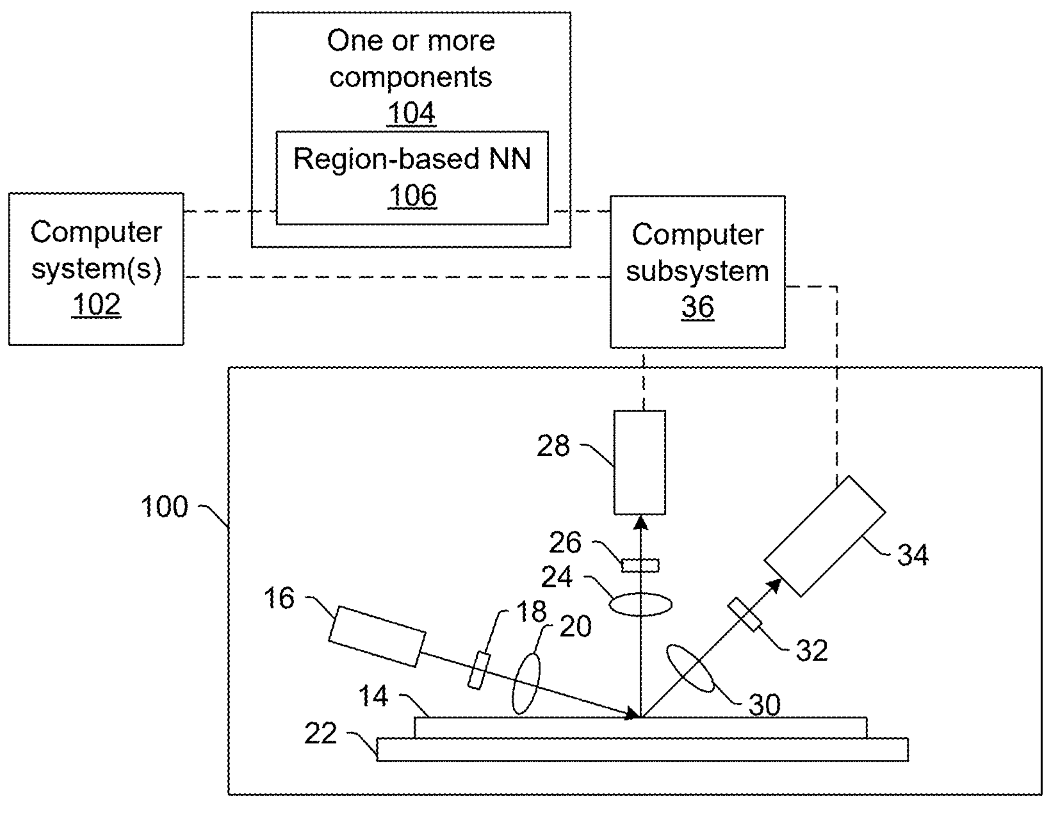
FIGS. 1 and 2 are schematic diagrams illustrating side views of embodiments of a system configured as described herein.

While the invention is susceptible to various modifications and alternative forms, specific embodiments thereof are shown by way of example in the drawings and are herein described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to the drawings, it is noted that the figures are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals. Unless otherwise noted herein, any of the elements described and shown may include any suitable commercially available elements.

In general, the embodiments described herein are configured for determining information for a specimen location. More specifically, the embodiments provide methods and systems for enhancing defect detection and nuisance filtering in optical wafer inspection by using digital non-linear neural network based filtering. The embodiments described herein provide methods and systems for enhancing and optimizing defect detection in optical wafer inspection by applying non-linear digital filtering, called AiryNet™. Applying this filter results in higher sensitivity to targeted defect types. The embodiments can also be used to increase detection rate of defects of interest (DOIs) and/or simultaneously reduce the detection rate of nuisance events. The embodiments described herein also provide a method to predict and localize defect locations on optical images.

"Nuisances" (which is sometimes used interchangeably with "nuisance defects") as that term is used herein is generally defined as defects that a user does not care about and/or events that are detected on a specimen but are not really actual defects on the specimen. Nuisances that are not actually defects may be detected as events due to non-defect noise sources on a specimen (e.g., grain in metal lines on the specimen, signals from underlaying layers or materials on the specimen, line edge roughness (LER), relatively small critical dimension (CD) variation in patterned attributes, thickness variations, etc.) and/or due to marginalities in the inspection system itself or its configuration used for inspection.

The term "defects of interest (DOIs)" as used herein is defined as defects that are detected on a specimen and are really actual defects on the specimen. Therefore, the DOIs are of interest to a user because users generally care about how many and what kind of actual defects are on specimens being inspected. In some contexts, the term "DOI" is used to refer to a subset of all of the actual defects on the specimen, which includes only the actual defects that a user cares about. For example, there may be multiple types of DOIs on any given specimen, and one or more of them may be of greater interest to a user than one or more other types.

In some embodiments, the specimen is a wafer. The wafer may include any wafer known in the semiconductor arts. Although some embodiments may be described herein with respect to a wafer or wafers, the embodiments are not limited in the specimens for which they can be used. For example, the embodiments described herein may be used for specimens such as reticles, flat panels, personal computer (PC) boards, and other semiconductor specimens.

One embodiment of a system configured for determining information for a specimen location is shown in FIG. 1. In one embodiment, the system includes inspection subsystem 100 configured for generating images for the specimen including at least one of the one or more images for a specimen location used by the embodiments as described herein. In another embodiment, at least one of the one or more images generated for the specimen location is an optical wafer image generated by an inspection subsystem. In FIG. 1, the inspection subsystem is configured as a light-based inspection subsystem. However, the inspection subsystem may be configured as an electron beam or charged particle beam based inspection subsystem.

In general, the inspection subsystems described herein include at least an energy source and a detector. The energy source is configured to generate energy that is directed to a specimen. The detector is configured to detect energy from the specimen and to generate output responsive to the detected energy.

In a light-based inspection subsystem, the energy directed to the specimen includes light, and the energy detected from the specimen includes light. For example, as shown in FIG. 1, the inspection subsystem includes an illumination subsystem configured to direct light to specimen 14. The illumination subsystem includes at least one light source, e.g., light source 16. The illumination subsystem is configured to direct the light to the specimen at one or more angles of incidence, which may include one or more oblique angles and/or one or more normal angles. For example, as shown in FIG. 1, light from light source 16 is directed through optical element 18 and then lens 20 to specimen 14 at an oblique angle of incidence. The oblique angle of incidence may include any suitable oblique angle of incidence, which may vary depending on, for instance, characteristics of the specimen and the defects to be detected on the specimen.

The illumination subsystem may be configured to direct the light to the specimen at different angles of incidence. For example, the inspection subsystem may be configured to alter one or more parameters of one or more elements of the illumination subsystem such that the light can be directed to the specimen at an angle of incidence that is different than that shown in FIG. 1. In one such example, the inspection subsystem may be configured to move light source 16, optical element 18, and lens 20 such that the light is directed to the specimen at a different oblique angle of incidence or a normal (or near normal) angle of incidence. The illumination subsystem may have any other suitable configuration known in the art for directing the light to the specimen at one or more angles of incidence sequentially or simultaneously.

The illumination subsystem may also be configured to direct light with different characteristics to the specimen. For example, optical element 18 may be configured as a spectral filter and the properties of the spectral filter can be changed in a variety of different ways (e.g., by swapping out one spectral filter with another) such that different wavelengths of light can be directed to the specimen at different times.

Light source 16 may include a broadband plasma (BBP) light source. In this manner, the light generated by the light source and directed to the specimen may include broadband light. However, the light source may include any other suitable light source such as any suitable laser known in the art configured to generate light at any suitable wavelength (s). In addition, the laser may be configured to generate light that is monochromatic or nearly-monochromatic. In this manner, the laser may be a narrowband laser. The light source may also include a polychromatic light source that generates light at multiple discrete wavelengths or wavebands.

Light from optical element 18 may be focused onto specimen 14 by lens 20. Although lens 20 is shown in FIG. 1 as a single refractive optical element, in practice, lens 20 may include a number of refractive and/or reflective optical elements that in combination focus the light from the optical element to the specimen. The illumination subsystem shown in FIG. 1 and described herein may include any other suitable optical elements (not shown). Examples of such optical elements include, but are not limited to, polarizing component(s), spectral filter(s), spatial filter(s), reflective optical element(s), apodizer(s), beam splitter(s), aperture(s), and the like, which may include any such suitable optical elements known in the art. In addition, the system may be configured to alter one or more elements of the illumination subsystem based on the type of illumination to be used for inspection.

The inspection subsystem may also include a scanning subsystem configured to change the position on the specimen to which the light is directed and from which the light is detected and possibly to cause the light to be scanned over the specimen. For example, the inspection subsystem may include stage 22 on which specimen 14 is disposed during inspection. The scanning subsystem may include any suitable mechanical and/or robotic assembly (that includes stage 22) that can be configured to move the specimen such that the light can be directed to and detected from different positions on the specimen. In addition, or alternatively, the inspection subsystem may be configured such that one or more optical elements of the inspection subsystem perform some scanning of the light over the specimen such that the light can be directed to and detected from different positions on the specimen. The light may be scanned over the specimen in any suitable fashion such as in a serpentine-like path or in a spiral path.

The inspection subsystem further includes one or more detection channels. At least one of the detection channel(s) includes a detector configured to detect light from the specimen due to illumination of the specimen by the system and to generate output responsive to the detected light. The inspection subsystem shown in FIG. 1 includes two detection channels, one formed by collector 24, element 26, and detector 28 and another formed by collector 30, element 32, and detector 34. The two detection channels are configured to collect and detect light at different angles of collection. In some instances, both detection channels are configured to detect scattered light, and the detection channels are configured to detect light that is scattered at different angles from the specimen. However, one or more of the detection channels may be configured to detect another type of light from the specimen (e.g., reflected light).

In FIG. 1, both detection channels are shown positioned in the plane of the paper and the illumination subsystem is also shown positioned in the plane of the paper. Therefore, in this embodiment, both detection channels are positioned in (e.g., centered in) the plane of incidence. However, one or more of the detection channels may be positioned out of the plane of incidence. For example, the detection channel formed by collector 30, element 32, and detector 34 may be configured to collect and detect light that is scattered out of the plane of incidence. Therefore, such a detection channel may be commonly referred to as a "side" channel, and such a side channel may be centered in a plane that is substantially perpendicular to the plane of incidence.

Although FIG. 1 shows an embodiment of the inspection subsystem that includes two detection channels, the inspection subsystem may include a different number of detection channels (e.g., only one detection channel or two or more detection channels). The detection channel formed by collector 30, element 32, and detector 34 may form one side channel as described above, and the inspection subsystem may include an additional detection channel (not shown) formed as another side channel that is positioned on the opposite side of the plane of incidence. Therefore, the inspection subsystem may include the detection channel that includes collector 24, element 26, and detector 28 and that is centered in the plane of incidence and configured to collect and detect light at scattering angle(s) that are at or close to normal to the specimen surface. This detection channel may therefore be commonly referred to as a "top" channel, and the inspection subsystem may also include two or more side channels configured as described above. As such, the inspection subsystem may include at least three channels (i.e., one top channel and two side channels), and each of the at least three channels is configured to collect light at different scattering angles than each of the other collectors.

As described further above, one or more of the detection channels may be configured to detect scattered light. Therefore, the inspection subsystem shown in FIG. 1 may be configured for dark field (DF) inspection. However, the inspection subsystem may also or alternatively include detection channel(s) that are configured for bright field (BF) inspection. Therefore, the inspection subsystems described herein may be configured for only DF, only BF, or both DF and BF inspection. Although each of the collectors are shown in FIG. 1 as single refractive optical elements, each of the collectors may include refractive optical element(s) and/or reflective optical element(s).

The one or more detection channels may include any suitable detectors known in the art such as photo-multiplier tubes (PMTs), charge coupled devices (CCDs), and time delay integration (TDI) cameras. The detectors may also include non-imaging detectors or imaging detectors. If the detectors are non-imaging detectors, each of the detectors may be configured to detect certain characteristics of the scattered light such as intensity but may not be configured to detect such characteristics as a function of position within the imaging plane. As such, the output that is generated by each of the detectors in each of the detection channels may be signals or data, but not image signals or image data. In such instances, a computer subsystem may be configured to generate images of the specimen from the non-imaging output of the detectors. However, in other instances, the detectors may be configured as imaging detectors that are configured to generate imaging signals or image data. Therefore, the inspection subsystem may be configured to generate images in a number of ways.

Computer subsystem 36 may be coupled to the detectors of the inspection subsystem in any suitable manner (e.g., via one or more transmission media, which may include "wired" and/or "wireless" transmission media) such that the computer subsystem can receive the output generated by the detectors. Computer subsystem 36 may be configured to perform a number of functions using the output of the detectors as described further herein. Computer subsystem 36 may be further configured as described herein.

Computer subsystem 36 (as well as other computer subsystems described herein) may also be referred to herein as computer system(s). Each of the computer subsystem(s) or system(s) described herein may take various forms, including a personal computer system, image computer, mainframe computer system, workstation, network appliance, Internet appliance, or other device. In general, the term "computer system" may be broadly defined to encompass any device having one or more processors, which executes instructions from a memory medium. The computer subsystem(s) or system(s) may also include any suitable processor known in the art such as a parallel processor. In addition, the computer subsystem(s) or system(s) may include a computer platform with high speed processing and software, either as a standalone or a networked tool.

If the system includes more than one computer subsystem, then the different computer subsystems may be coupled to each other such that images, data, information, instructions, etc. can be sent between the computer subsystems. For example, computer subsystem 36 may be coupled to computer system(s) 102 as shown by the dashed line in FIG. 1 by any suitable transmission media, which may include any suitable wired and/or wireless transmission media known in the art. Two or more of such computer subsystems may also be effectively coupled by a shared computer-readable storage medium (not shown).

In an electron beam inspection subsystem, the energy directed to the specimen includes electrons, and the energy detected from the specimen includes electrons. In one such embodiment shown in FIG. 2, the inspection subsystem includes electron column 122, and the system includes computer subsystem 124 coupled to the inspection subsystem. Computer subsystem 124 may be configured as described above. In addition, such an inspection subsystem may be coupled to another one or more computer subsystems in the same manner described above and shown in FIG. 1.

Figure 2:
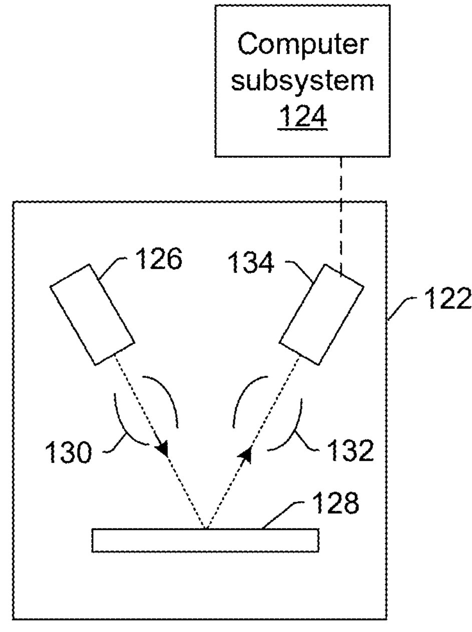

As also shown in FIG. 2, the electron column includes electron beam source 126 configured to generate electrons that are focused to specimen 128 by one or more elements 130. The electron beam source may include, for example, a cathode source or emitter tip, and one or more elements 130 may include, for example, a gun lens, an anode, a beam limiting aperture, a gate valve, a beam current selection aperture, an objective lens, and a scanning subsystem, all of which may include any such suitable elements known in the art.

Electrons returned from the specimen (e.g., secondary electrons) may be focused by one or more elements 132 to detector 134. One or more elements 132 may include, for example, a scanning subsystem, which may be the same scanning subsystem included in element(s) 130.

The electron column may include any other suitable elements known in the art. In addition, the electron column may be further configured as described in U.S. Pat. No. 8,664,594 issued Apr. 4, 2014 to Jiang et al., U.S. Pat. No. 8,692,204 issued Apr. 8, 2014 to Kojima et al., U.S. Pat. No. 8,698,093 issued Apr. 15, 2014 to Gubbens et al., and U.S.

Pat. No. 8,716,662 issued May 6, 2014 to MacDonald et al., which are incorporated by reference as if fully set forth herein.

Although the electron column is shown in FIG. 2 as being configured such that the electrons are directed to the specimen at an oblique angle of incidence and are scattered from the specimen at another oblique angle, the electron beam may be directed to and scattered from the specimen at any suitable angles. In addition, the electron beam inspection subsystem may be configured to use multiple modes to generate output for the specimen as described further herein (e.g., with different illumination angles, collection angles, etc.). The multiple modes of the electron beam inspection subsystem may be different in any output generation parameters of the inspection subsystem.

Computer subsystem 124 may be coupled to detector 134 as described above. The detector may detect electrons returned from the surface of the specimen thereby forming electron beam images of (or other output for) the specimen. The electron beam images may include any suitable electron beam images. Computer subsystem 124 may be configured to perform any step(s) described herein. A system that includes the inspection subsystem shown in FIG. 2 may be further configured as described herein.

FIGS. 1 and 2 are provided herein to generally illustrate configurations of an inspection subsystem that may be included in the system embodiments described herein. Obviously, the inspection subsystem configurations described herein may be altered to optimize the performance of the inspection subsystem as is normally performed when designing a commercial inspection system. In addition, the systems described herein may be implemented using an existing inspection system (e.g., by adding functionality described herein to an existing inspection system) such as the tools that are commercially available from KLA Corp., Milpitas, Calif. For some such systems, the methods described herein may be provided as optional functionality of the inspection system (e.g., in addition to other functionality of the inspection system). Alternatively, the inspection system described herein may be designed "from scratch" to provide a completely new inspection system.

Although the inspection subsystem is described above as being a light or electron beam inspection subsystem, the inspection subsystem may be an ion beam inspection subsystem. Such an inspection subsystem may be configured as shown in FIG. 2 except that the electron beam source may be replaced with any suitable ion beam source known in the art. In addition, the inspection subsystem may include any other suitable ion beam system such as those included in commercially available focused ion beam (FIB) systems, helium ion microscopy (HIM) systems, and secondary ion mass spectroscopy (SIMS) systems.

The inspection subsystem may be configured to generate output, e.g., images, of the specimen with multiple modes. In general, a "mode" is defined by the values of parameters of the inspection subsystem used for generating images of a specimen (or the output used to generate images of the specimen). Therefore, modes may be different in the values for at least one of the parameters of the inspection subsystem (other than position on the specimen at which the output is generated). For example, the modes may be different in any one or more alterable parameters (e.g., illumination polarization(s), angle(s), wavelength(s), etc., detection polarization(s), angle(s), wavelength(s), etc.) of the inspection subsystem. The inspection subsystem may be configured to scan the specimen with the different modes in the same scan or different scans, e.g., depending on the capability of using multiple modes to scan the specimen at the same time.

In a similar manner, the electron beam subsystem may be configured to generate images with two or more modes, which can be defined by the values of parameters of the electron beam subsystem used for generating images for a specimen. Therefore, modes may be different in the values for at least one of the electron beam parameters of the electron beam subsystem. For example, different modes may use different angles of incidence for illumination.

In another embodiment, the system includes a metrology subsystem. In a further embodiment, the system includes a defect review subsystem. For example, the embodiments of the inspection subsystem shown in FIGS. 1 and 2 may be modified in one or more parameters to provide different imaging capability depending on the application for which it will be used. In one such example, the inspection subsystem may be configured to have a higher resolution if it is to be used for metrology rather than for inspection. In other words, the embodiments of the inspection subsystem shown in FIGS. 1 and 2 describe some general and various configurations for an imaging subsystem that can be tailored in a number of manners that will be obvious to one skilled in the art to produce systems having different imaging capabilities that are more or less suitable for different applications.

In this manner, the imaging subsystem may be configured for generating output that is suitable for re-detecting defects on the specimen in the case of a defect review system and for measuring one or more characteristics of the specimen in the case of a metrology system. In a defect review system embodiment, computer subsystem 124 shown in FIG. 2 may be configured for re-detecting defects on specimen 128 by applying a defect re-detection method to the output generated by detector 134 and possibly determining additional information for the re-detected defects using the output generated by the detector. In a metrology system embodiment, computer subsystem 36 shown in FIG. 1 may be configured for determining one or more characteristics of specimen 14 using the output generated by detectors 28 and/or 34.

As noted above, the inspection subsystem is configured for scanning energy (e.g., light, electrons, etc.) over a physical version of the specimen thereby generating output for the physical version of the specimen. In this manner, the inspection subsystem may be configured as an "actual" subsystem, rather than a "virtual" subsystem. However, a storage medium (not shown) and computer subsystem(s) 102 shown in FIG. 1 may be configured as a "virtual" system. In particular, the storage medium and the computer subsystem(s) may be configured as a "virtual" inspection system as described in commonly assigned U.S. Pat. No. 8,126,255 issued on Feb. 28, 2012 to Bhaskar et al. and U.S. Pat. No. 9,222,895 issued on Dec. 29, 2015 to Duffy et al., which are incorporated by reference as if fully set forth herein. The embodiments described herein may be further configured as described in these patents.

The computer subsystem is configured for inputting one or more images for a specimen location into a region-based neural network configured for performing digital non-linear filtering of the one or more images to thereby generate a filtered image for the specimen location. In some embodiments, the system includes one or more components executed by the computer subsystem, and the one or more components include the region-based neural network. Such a system embodiment may or may not also include the inspection subsystem. In this manner, the embodiments described herein may be performed on-tool. For example, as shown in FIG. 1, the system may include one or more components 104 executed by computer subsystem 36 (and/or computer system(s) 102), and the one or more components include region-based neural network (NN) 106. Computer subsystem 36 (and/or computer system(s) 102) may input images generated for specimen 14 (by inspection subsystem 100 and/or one or more of the computer subsystems) into the region-based neural network. Region-based NN 106 performs digital non-linear filtering of the one or more images to generate a filtered image for the specimen location, which may then be sent to computer subsystem 36 (and/or computer system(s) 102). The computer subsystem may then be configured for performing one or more functions described herein with the filtered image.

The computer subsystem may be configured for acquiring the one or more images, which may or may not include generating the one or more images, e.g., using an inspection subsystem configured as described herein. Instead, the computer subsystem may acquire the image(s) from a storage medium in which they have been stored or from another method or system that generates the image(s). In this manner, the computer subsystem may acquire the image(s) by retrieving or receiving them from another method or system. Therefore, one system may generate the images described herein, and the system described herein may generate filtered images with the region-based neural network and determine information for specimen locations from the filtered images as described further herein. However, one system may be configured for performing all or at least some of these functions.

In one embodiment, the region-based neural network is configured as an all convolutional region-based neural network with multiple input image channels. The supervised nonlinear image filtering techniques described herein may, therefore, be based on digital nonlinear filtering using an all convolutional region-based neural net with multiple input channels. The "region-based neural network" is also referred to herein as simply the "neural network," "neural net," "AiryNet™," "AiryNet™ neural network," etc. The neural net is "region-based" in that not every pixel in the input image is labeled either in training or inference. Instead, as described further herein, different subregions (e.g., defect and non-defect subregions) in the input image may be labeled for training or labeled by the neural net during inference (runtime). The image filtering is "digital" in that it is not performed by tool hardware, but is performed in a post-image generation phase by a computer component (the neural network).

In another embodiment, the region-based neural network is configured with a number of training parameters on the order of 1000 or less. In a further embodiment, the region-based neural network includes a predetermined, limited number of layers (e.g., only 3 layers, fewer than 10 layers, etc.). In an additional embodiment, the region-based neural network includes only a predetermined limited number of layers (e.g., 3 layers, fewer than 10 layers, etc.) of stacked digital dilated convolutional filters with dilation factors ranging from 0 up to some predetermined limited number. For example, compared to traditional deep learning (DL) neural net configurations with 1M or more training parameters and tens of layers, the configuration of the neural net described herein has been engineered to tremendously reduce the number of the training parameters down to 1000 or less and number of layers to a predetermined, limited number (e.g., 3), which still allows inducing non-linearity and gain stability when trained with a highly imbalanced data set having substantially few labeled data points (<100) in the DOI class. Of course, the neural net configurations described herein are the best possible ones identified by the inventors, but variations of these neural net configurations may also be suitable for the applications described herein.

Figure 3:
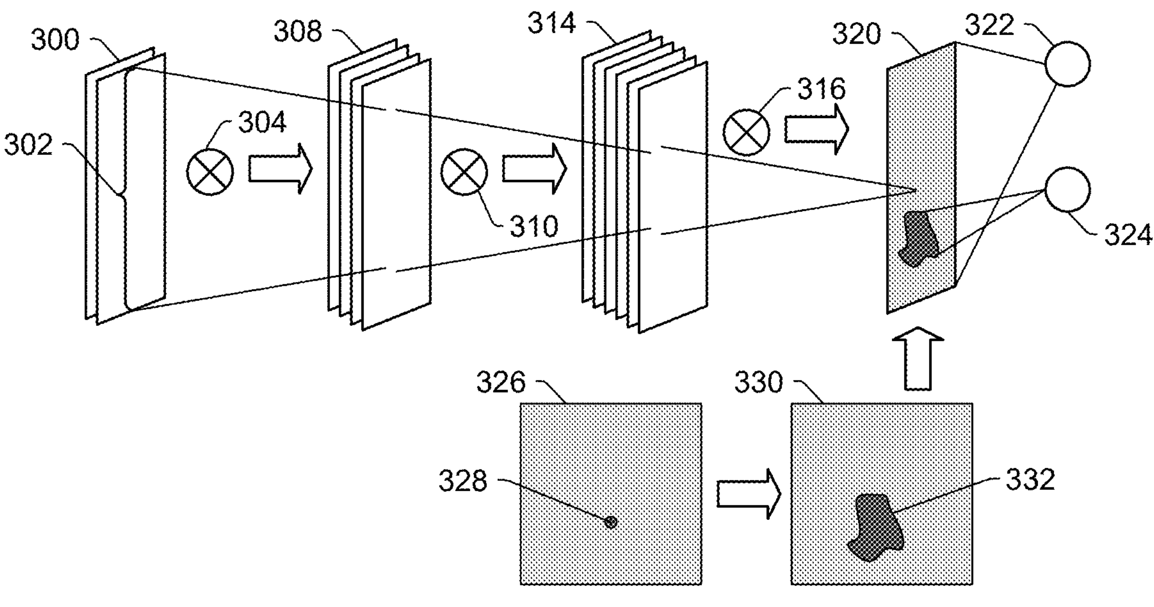
FIG. 3 is a schematic diagram illustrating one embodiment of a configuration of a cascaded filter neural network for image filtering.

FIG. 3 shows a configuration of a cascaded filter neural network for image filtering. This configuration consists of only 3 layers of stacked digital dilated convolutional filters with increasing dilation factors ranging from 0 up to some limiting number. In addition, the neural network includes relatively shallow stacks of convolutional filters followed by nonlinear activations. Input image(s) in one or more channels (not shown) may be input to first stack 300 of convolutional layers having receptive FOV 302 followed by nonlinear activations 304. The output of nonlinear activations 304 is input to second stack 308 of convolutional layers followed by nonlinear activations 310. Final stack 314 of convolutional layers may be followed by nonlinear activations 316 followed by regional max pooling layer 320. The regional max pooling layer may generate outputs 322 and 324. Output 322 is responsive to the noise region shown by the lighter gray area in regional max pooling layer 320, and output 324 is responsive to the detection region shown by the darker gray area in the regional max pooling layer. In this manner, output 322 may be a nuisance classification, and output 324 may be a defect/nuisance classification.

In order to configure the AiryNet™ for the pre-detection stage, the net may be first trained on a collection of relatively large size images (e.g., job dumps, typically 4K by 1K pixels) or on smaller sized image patches (e.g., 32×32 pixels, 64×64 pixels, etc.) from lot results. For the post-detection case, the training may be implemented using patch images from a lot result. The image patches from the lot result may include sets of one or more of test, reference, and mask images for each detected defect location. In this manner, training of the neural network may be performed with training images such as inspection mask image 326 (an image generated by an inspection tool masking out the non-defect parts of a difference image) showing detection spot 328. The training images (or at least the defect portion of the training images) may be expanded thereby producing image 330 showing expanded detection spot 332, which may be used for training instead of image 326 or in combination with image 326. For example, the detected defect spot in the mask image may be dilated/expanded (which can be performed in any suitable way known in the art). In this manner, the defect region in the training images may be defined using one or more of a dilated inspection mask image, a defect review (e.g., scanning electron microscope (SEM)) image if available, and design information if available. During training then, the nuisance classification and defect/nuisance classifications generated by the neural network (i.e., outputs 322 and 324) may be compared with the labels of the training images, and one or more parameters of the neural network may be altered until the classifications match the labels for the training images.

The training may therefore be performed in a supervised manner, meaning that the images that are used for training are labeled in some manner, e.g., by a user or by another method or system having known capability, e.g., for detecting defects on a specimen and/or separating detected defects into DOIs and nuisances. In this manner, the embodiments described herein provide supervised nonlinear image filtering techniques for defect detection and nuisance reduction for optical wafer inspections and possibly for other applications described herein. Training of the neural net may be performed in any suitable manner known in the art. Generally, as described briefly above, training may include inputting the training images into the neural net and modifying one or more parameters of the neural net until the neural net output matches the labels assigned to the training images. Of course, training may be much more complex than this, and the neural net may be trained in any other suitable manner known in the art.

In a further embodiment, the computer subsystem is configured for training multiple models with different combinations of predetermined hyperparameter values, identifying which one of the multiple models produces results with a highest predefined metric (e.g., accuracy or another performance-related score or metric), and selecting the identified one of the multiple models as the region-based neural network. For example, a neural net training procedure may also be performed with several parameters, called hyperparameters. These hyperparameters include, but are not limited to, a regularization factor, learning rate, network configuration, data augmentation, dropout rate, etc. The values of some parameters are preset/fixed or provided by users and not optimized during the training iteration, while others are substantially sensitive to training data, and optimization of such parameters may be performed with a hyperparameter search. A brute force method may be deployed for hyperparameter search, where the computer subsystem tries all the possible combinations of the given hyperparameter values to train multiple models and then searches for the best one, e.g., with highest accuracy. The best model identified by the hyperparameter search may then be selected as the final model.

In one embodiment, the computer subsystem is configured for training the region-based neural network with a training data set including training images, and not all pixels in the training images are labeled. For example, an advantage of the region-based training approach comes from the fact that every pixel in the input image does not need to be precisely annotated/labeled. In another embodiment, the computer subsystem is configured for training the region-based neural network with a training data set including training images, and different regions in the training images are labeled. The different regions, e.g., a defect subregion and a non-defect subregion, for each image may be automatically determined based on the original default detection method. For example, the defect and nuisance regions for the output images may be defined either based on available SEM images or detection locations determined by known good tools and methods. The network may then be trained using the regions to improve convergence and stability.

In this manner, the neural net filter coefficients may be optimized using a region-based supervised machine learning (ML) method based on image samples for DOIs and nuisance defects. Namely, each training image may be divided into two subregions, defect and noise subregions. The defect subregion may be obtained by dilating the defect detection spot (which can be performed in any suitable way known in the art) extracted from the mask image generated for the defect. The dilated/expanded defect area is then the designated defect subregion, and the surrounding or remaining area is designated as the noise subregion. The defect subregion and the noise subregion are therefore different regions of the same image. Noise and defect subregions can be additionally adjusted using region information. Noise and defect subregions can also be adjusted by removing pixels from these subregions based on design information or image (s) if available. Max signal values for defect and surrounding noise regions are extracted from each image. These signal values are then binned into a positive class if it is a DOI or a negative class if it is a nuisance or surrounding noise event. The cost function used for optimization may be a negative log likelihood. Using a stochastic gradient descent method, the neural net filters may be optimized in order to increase the separation between signals in positive and negative classes.

In one embodiment, the computer subsystem is configured for training the region-based neural network with a training data set that includes training images and labels for one or more defect subregions and one or more non-defect subregions in the training images. One such embodiment also includes applying weights to one or more of the training images and labels to alter a contribution between positive and negative classes in a cost function used for the training. Additional such embodiments include applying weights to one or more of the training images and labels to alter a contribution between different positive classes or different negative classes in a cost function used for the training. For example, the defect weights can be applied to data points to balance the contribution between the positive and negative classes in the cost function. Moreover, the defect weights can be adjusted inside each class in order to enhance or reduce the contribution of a selected subset of the defects. In addition, the defect weights can be further adjusted inside the negative class in order to favor more either local defect signal enhancement or DOI-nuisance separation if the optical properties of nuisances and surrounding noise events are different.

Figure 4:
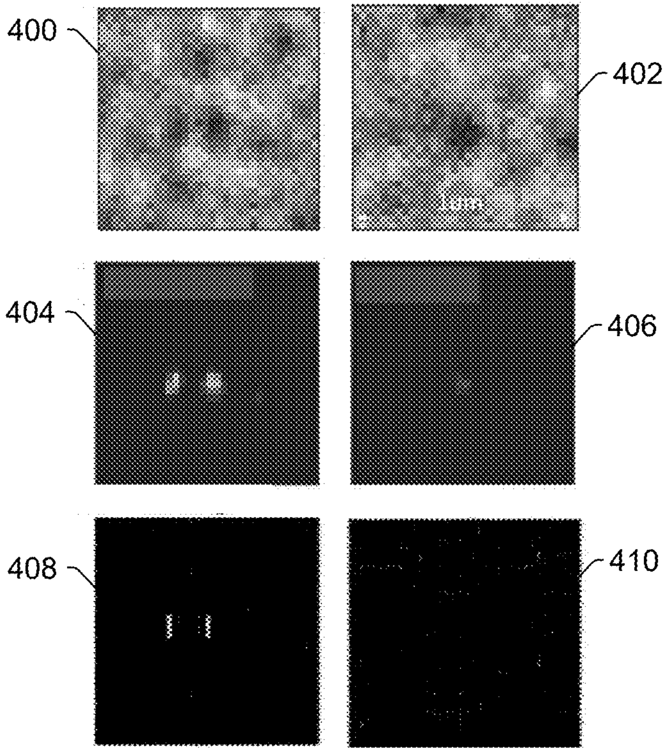
FIG. 4 is a schematic diagram illustrating examples of difference images for a defect of interest (DOI) and a nuisance, filtered images for the difference images generated by an embodiment described herein, and scanning electron microscope (SEM) image sketches showing defect positions in the difference images.

In an additional embodiment, the region-based neural network is configured for labeling at least one of one or more defect subregions and one or more non-defect subregions in the filtered image. For example, the AiryNet™ technique predicts defect locations by outputting the images with filtered defect signals. For any one specimen location, the output image has the same resolution as the input image(s) showing the filtered defect signal and its location, as shown in FIG. 4. Images 400 and 402 are difference images for a DOI and nuisance, respectively, showing multiple negative polarity (dark) spots, that obscure defect localization. Filtered images 404 and 406 are generated by the neural network from images 400 and 402, respectively. The filtered images (intensity maps) predict and resolve multiple defect locations (in image 404) and show strong signal for two DOIs (in image 404) and weak signals for nuisance (in image 406). Images 408 and 410 are SEM image sketches corresponding to images 400 and 402, respectively. The aligned corresponding SEM image sketches show two defects (light lines in the center of image 408) and no defect (in image 410). The SEM image sketch defect positions therefore match those of the predicted images.

FIG. 4, therefore, shows defect images before and after the AiryNet™ is applied. The filtering removes surrounding noise, enhances defect signal, and accurately reveals multiple DOI locations on image 404, which match those of corresponding SEM image sketch 408. For the nuisance case, the filtering suppresses the signal below the threshold level. FIG. 5 shows the effect of AiryNet™ filtering on the surrounding noise pixels. For the same 100% DOI true positive rate, the neural net suppresses the background noise pixels by 2.5 orders as compared to the no filter case on test images. In order to determine the trained AiryNet™ performance, a validation inspection with AiryNet™ filtering can be run either on another wafer or the same wafer but in the area not used for AiryNet™ training.

The ROC curves in FIG. 5 show that the AiryNet™ when used for filtering suppresses the background noise pixels by 2.5 orders for the same true positive values as compared to the no filter case. In particular, FIG. 5 shows ROC curve 500 generated after AiryNet™ filtering and ROC curve 502 generated without any such filtering. In addition, FIG. 5 shows example 504 of a DOI image and example 506 of a nuisance image generated by the AiryNet™, and DOI image 508 and nuisance image 510, which were filtered by AiryNet™ to produce DOI image 504 nuisance image 506, respectively. As can be seen by comparing the DOI and nuisance images before and after AiryNet™ filtering, the AiryNet™ filtering greatly suppresses background pixel noise thereby enabling a much better ROC curve.

In some embodiments, the computer subsystem is configured for training and validating the region-based neural network with a cross-validation method. In one such embodiment, an initial stage of the cross-validation method generates cross-validated attributes for training images, and a subsequent stage of the cross-validation method is performed with the cross-validated attributes in combination with one or more attributes generated by a different supervised attribute-based filtering method. For example, in the case of a relatively limited training dataset (e.g., when the number of DOIs is relatively small), it is better to avoid splitting the dataset into strictly training and test subsets. One of the reasons for that is to avoid discarding model predictions on relatively scarce data points in the training subset due to overfitting.

In such cases, the AiryNet™ can be trained and validated on the same set of defects using a cross-validation method. For example, the dataset may be split into n-folds. (n−1) folds are used for training, and the remaining 1 fold is used for validation to generate predictions. This process is repeated multiple times, each time using a different fold as the validation set. This way cross-validated predictions are generated for the entire dataset. Then, the cross-validated attributes from AiryNet™ can be used together with other attributes available on the inspection tool and fed into the next stage of supervised attribute-based filtering available on inspection tools.

In some embodiments, the computer subsystem is configured for selecting the one or more images for the specimen location input to the region-based neural network from multiple images available for the specimen location. For example, the neural network may include multiple input image channels, and the images that are input to the neural network for any one specimen location may be selected by the computer subsystem. Typically, the same type(s) of images may be input to the neural network for all specimen locations that are being inspected, measured, etc. In one such example, the computer subsystem may select the one or more types of images that will be input to the neural network during recipe setup, and then those image(s) may be input to the neural network for all locations on the specimen. However, it is conceivable that, in the same process, the image(s) that are input to the neural network for different specimen locations may be different.

In another embodiment, the one or more images input to the region-based neural network include at least one of a difference image, a reference image, a test image, and a design image for the specimen location. For example, the neural network may include image channel(s) for at least one of difference images, reference images, test images, and design images, or some combination thereof. Even with multiple input channels (images), AiryNet™ generates just a single output image, which may also be referred to as a probability density map.

The images input to the neural network may vary depending on the configuration of the neural network and the images used to train it. For example, the images that are input to the neural network may include only difference images generated by a defect detection algorithm. However, the images that are input to the neural network may include only test images generated by the inspection subsystem. The images that are input to the neural network for any one specimen location or detected defect may also include multiple images, which may include two or more of a test image, a reference image, and a difference image. The images may have any suitable size, which may vary depending on the imaging hardware configuration and possibly the neural network architecture. In addition, the images that are input to the neural network for any one specimen location or detected defect may be relatively small patch images or much larger frame or job images depending on, for example, the application. The input to the neural network may also include other information for the specimen location such as a design clip, which may be a relatively small portion of the design for the specimen corresponding to the specimen location.

The images that are input to the neural network may include only the specimen images generated by the inspection subsystem in which a defect has been detected. Defect detection may be performed on the specimen images generated by the inspection subsystem in any suitable manner known in the art. For example, defect detection may include applying a defect detection method to the specimen images or difference images generated therefrom. In the most simple configuration, defect detection may include applying a threshold to the images (or the difference images) and determining that any image having a signal above the threshold corresponds to a potential defect. The potential defects may include any type of defects that are present and detected on the specimen as well as any nuisances that are erroneously detected as potential defects and therefore have to be separated from the actual defects on the specimen. Defect detection may also be performed by applying any suitable defect detection algorithm to the specimen images such as the MDAT algorithm, which is used by some inspection tools commercially available from KLA.

In some instances, the embodiments described herein may be configured for performing the defect detection. However, another system or method may be configured for performing defect detection on the images, and then only the images in which a defect has been detected may be input to the neural network by the embodiments described herein.

However, in other instances, the images that are input into the neural network may include any specimen images generated by the inspection subsystem for the specimen. For example, the neural network may be configured for performing digital non-linear filtering of all of the images generated for the specimen. In this manner, the images may be input to the neural network without performing any kind of prior defect detection on the images.

In another embodiment, the region-based neural network is trained for a first type of DOI, the computer subsystem is configured for inputting at least one image for the specimen location into an additional region-based neural network configured for performing digital non-linear filtering of the at least one image to thereby generate an additional filtered image for the specimen location, and the additional region-based neural network is trained for a second type of DOI. For example, if multiple DOI types may be present on a wafer, multiple AiryNet™ neural networks can be trained, each AiryNet™ for each defect type. These multiple AiryNet™ neural networks can be added to the inspection recipe and used to calculate multiple attributes to improve separability for different defect types. Each of the AiryNet™ neural networks may have a configuration as described herein and may be trained as described further herein, just with different training data sets (for the different DOIs).

The computer subsystem is also configured for determining information for the specimen location from the filtered image. For example, the AiryNet™ does not itself perform defect detection or nuisance filtering. Instead, the AiryNet™ just outputs a filtered image. That filtered image can then be used as input to a different algorithm or method including for applications described further herein.

In one embodiment, determining the information includes applying a defect detection method to the filtered image. Therefore, one of the ways that the neural net filtering described herein can be used is inline during inspection at a pre-detection stage. For example, after the AiryNet™ is trained, it can be applied inline during the detection processing for image filtering. In this stage, the neural net generates a filtered image. For the pre-detection case, the generated filtered image is fed into a defect detection algorithm or method. That defect detection may be performed as described further above or in any other suitable manner known in the art. In other words, the filtered images can be used in the same manner as any other images input to any suitable defect detection method.

In another embodiment, determining the information includes applying a defect detection method to the filtered image and at least one other image generated for the specimen location. Therefore, the neural net filtering described herein can be used inline during inspection at a pre-detection stage in different ways. For example, the filtered image can alone be used for defect detection or it can be used as a complimentary image or a substitute to one of the images in a currently used detection scheme. In one such example, the filtered image and an original difference image may both be input to a defect detection method. In another example, the filtered image and an original reference image used to generate a difference image for the specimen location may be input to a defect detection method. Other images described herein may also be input to defect detection with the filtered image.

AiryNet™ can also be used at post-detection. In some embodiments, determining the information includes determining one or more attributes of the specimen location from the filtered image and performing nuisance filtering based on the one or more attributes. For example, at this stage, the neural net is trained on image patches from a lot result or combination of lot results and then applied to an input set of images for each defect in the test lot result to calculate the attributes. These attributes are then used in nuisance filtering. Therefore, the neural net filtering described herein can be used inline during inspection or offline at a post-detection stage.

Like the pre-detection stage, the neural net generates a filtered image. For the post-detection case, the neural net filtering is applied to inspection image patches in the lot result to generate filtered images. Attribute(s) are calculated from defect and noise subregions of filtered images and then used in nuisance filtering or defect classification for nuisance filtering. The attribute(s) may be generated by extracting max signals from defect and noise subregions in the filtered images generated by the AiryNet™. These attribute (s), not the filtered images, may then be used for nuisance filtering, possibly together with other currently generated defect and/or image attributes.

AiryNet™ filtering may also be used for both pre- and post-detection stages for the same wafer. For example, the filtered images generated for defect detection may also be used for calculating attributes for nuisance filtering. In this manner, the same AiryNet™ filter may be trained and used for generating filtered images for both applications. However, if it makes sense to generate different AiryNet™ filters for the different applications (e.g., when different images are used for defect detection vs. nuisance filtering attribute calculation), then different AiryNet™ filters may be trained and used for filtering images for defect detection purposes or nuisance filtering purposes for the same wafer.

The AiryNet™ may also be trained for one wafer and then used for wafers having the same design and at the same process step. In other words, the AiryNet™ filters may be design- and process step-specific but not necessarily wafer-specific. Therefore, one trained AiryNet™ may be used for the same inspection recipe performed on multiple wafers. In addition, in some cases, the same trained AiryNet™ may be useful for different specimen designs and/or process steps, or different AiryNet™ filters may be trained and used for specimens having different designs or for specimens at different stages in device fabrication. Furthermore, it may be possible that an AiryNet™ trained for one use case may be used as an initial network configuration that is retrained to generate a different AiryNet™ for another use case. Such retraining may be performed in the same manner as the training described herein.

FIG. 6 shows a use case for AiryNet™ filtering at a post-detection stage. As shown in step 600, the method may include defining a goal or reason for determining a post-detection attribute. As shown in FIG. 6, one example of a goal may be to improve DOI-nuisance separation for a logic device in which the nuisance rate is relatively high. Obviously, this is just one example of a goal that may be defined for the embodiments described herein. In step 602, the method includes sampling DOIs and nuisances from a lot result and training the neural net on the lot result sampled patches (to improve DOI-nuisance separation). The sampling may be performed in any suitable manner, and the training may be performed as described further herein. In step 604, the method includes running the neural net on lot result patches, extracting attributes (such as peak signal in defect and noise regions), and using them as attributes for further filtering with a defect classifier. These steps may be performed as described further herein.

FIG. 7 shows DOI capture rate vs. nuisance rate curve 700 for a wafer after AiryNet™ filtering is applied. The AiryNet™ filtering was applied on a highly imbalanced data set (number of DOIs and nuisances are 122 and 5700, respectively). At 50% nuisance rate corresponding to 50× nuisance reduction factor, the DOI capture rate reaches 90%. In other words, while advantageously keeping 90% of the DOIs, the cascaded filtering performed by AiryNet™ reduces nuisance count by 50× as compared to magnitude-based filtering.

FIG. 7 also shows results of a stability test including ROC curves 702 corresponding to multiple optimizations on randomly selected 50% of DOIs and nuisances. The rest of the defects were used for testing. The ROC curves labeled cascaded filters ROC curves in FIG. 7 are for AiryNet™ filtering results and the ROC curves labeled magnitude based ROC curves in FIG. 7 are for filtering using only defect signal magnitude. The nuisance count fluctuations are significantly suppressed when applying AiryNet™ filtering which indicates good stability.

The computer subsystem may generate results, which may include the results of any of the steps described herein. The computer subsystem may be configured for storing the results in any suitable computer-readable storage medium. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc.

The results may include the trained AiryNet™ neural network, defect detection results generated with the trained AiryNet™ neural network, nuisance filtering results generated with the trained AiryNet™ neural network, or any other information generated by the embodiments described herein. The results may be generated by the computer subsystem in any suitable manner. The results may have any suitable form or format such as a standard file type. The computer subsystem may generate the results and store the results such that the results can be used by the computer subsystem and/or another system or method to perform one or more functions with the AiryNet™ neural network and/or to perform one or more functions with results generated by the AiryNet™ neural network. For example, the AiryNet™ neural network (or its file name and location) may be stored in a recipe such as an inspection recipe so that it can be used for generating filtered images that are then used for detecting defects on a specimen or nuisance filtering defects detected on the specimen. In such situations, the computer subsystem may be configured for creating a new inspection recipe or modifying an existing inspection recipe.

In another example, the defects detected based on the filtered images generated by the AiryNet™ neural network or the nuisance filtering results generated based on the filtered images generated by the AiryNet™ neural network may be stored in a lot results file so that they can be used for one or more other functions described herein. In such instances, the computer subsystem may generate inspection results produced in part with the AiryNet™ neural network, which may include information for the detected defects such as defect IDs, location, etc., of the bounding boxes of the detected defects, sizes, detection scores, information about defect classifications such as class labels or IDs, etc., or any such suitable information known in the art. The results for the defects may be generated by the computer subsystem in any suitable manner. The results for the defects may have any suitable form or format such as a standard file type. The computer subsystem may generate the results and store the results such that the results can be used by the computer subsystem and/or another system or method to perform one or more functions for the specimen or another specimen of the same type.

Results and information generated by performing the inspection on the specimen may be used in a variety of manners by the embodiments described herein and/or other systems and methods. Such functions include, but are not limited to, altering a process such as a fabrication process or step that was or will be performed on the inspected specimen or another specimen in a feedback or feedforward manner. For example, the computer subsystem may be configured to determine one or more changes to a process that was or will be performed on a specimen inspected as described herein based on the detected defect(s). The changes to the process may include any suitable changes to one or more parameters of the process. The computer subsystem preferably determines those changes such that the defects can be reduced or prevented on other specimens on which the revised process is performed, the defects can be corrected or eliminated on the specimen in another process performed on the specimen, the defects can be compensated for in another process performed on the specimen, etc. The computer subsystem may determine such changes in any suitable manner known in the art.

Those changes can then be sent to a semiconductor fabrication system (not shown) or a storage medium (not shown) accessible to the computer subsystem and the semiconductor fabrication system. The semiconductor fabrication system may or may not be part of the system embodiments described herein. For example, the computer subsystem and/or inspection subsystem described herein may be coupled to the semiconductor fabrication system, e.g., via one or more common elements such as a housing, a power supply, a specimen handling device or mechanism, etc. The semiconductor fabrication system may include any semiconductor fabrication system known in the art such as a lithography tool, an etch tool, a chemical-mechanical polishing (CMP) tool, a deposition tool, and the like.

Each of the embodiments of the system described above may be combined together into one single embodiment. In other words, unless otherwise noted herein, none of the system embodiments are mutually exclusive of any other system embodiments.

In one such embodiment, the computer subsystem is configured for training the region-based neural network with a training data set that includes training images, at least one defect subregion or at least one non-defect subregion is labeled in each of the training images, not all pixels in the training images are labeled, and the region-based neural network is configured for labeling at least one of one or more defect subregions and one or more non-defect subregions in the filtered image. This embodiment may be configured and performed as described further herein.

In one such embodiment, determining the information includes applying a defect detection method to the filtered image. In another such embodiment, determining the information includes determining one or more attributes of the specimen location from the filtered image and performing nuisance filtering based on the one or more attributes. These steps may be performed as described further herein.

In an additional such embodiment, at least one defect subregion or at least one non-defect subregion in each of the training images are labeled based only on information about at least one location of a defect or a non-defect in at least one different image generated for the specimen. In some such embodiments, the information about the at least one location of the defect or the non-defect is determined from the at least one different image having a different scale than the training images. In a further embodiment, the information about the at least one location of the defect or the non-defect is determined from at least one different image without aligning the at least one different image to any of the training images. In a further such embodiment, the training images and the one or more images input to the region-based neural network are generated by an inspection subsystem, and the at least one different image is generated by a defect review subsystem.

The "different images" described above may or may not be ground truth information such as that term is commonly used but they may serve as the ground truth for labeling the training images for the embodiments described herein. For example, the different images may be any images other than the ones for which inference will be performed after neural net training and may also be different than the training images. The different images may therefore be ground truth type images, and their labels generated by a ground truth type method or system such as a SEM defect review tool may be used to label the training images as described herein. However, the different images may simply be detection spots extracted from mask images generated by inspection of the specimen or a different specimen using a different, known good defect detection method. As described further herein, the advantages of using any of such different images for training image labeling is the result of the region-based nature of the embodiments described herein.

The embodiments described above therefore have some important differences from currently used neural network training and inference used for the applications described herein. For example, a currently used neural net detection method (for example, one that might be used on an electron beam type inspection system) would require labeling or annotating every pixel for the neural net training. For optical inspection, pixel labeling typically comes from SEM images and requires a set of additional and often time consuming steps: acquisition of SEM images and then SEM-to-optical image scaling and alignment and accurate transfer of defect locations as pixel labels to the optical images. Furthermore, due to various reasons, SEM images might not be available for the neural net training image labeling which prevents defect location labeling at the image level.

An important distinction of the embodiments described herein is therefore that they do not require or rely on accurate labeling at the pixel level for neural net training. Only binary labels such as DOI or nuisance (one label per each input defect image set) are sufficient for training. The absence of precise labeling at the pixel level is compensated for by the fact that training the neural network embodiments herein just roughly needs to know where the defect is located, and this is achieved by using a region-based approach. The defect images may be segmented into defect/noise subregions using only the detection spot extracted from the mask image. Training the neural net using the binary labels together with the subregions turns out to be sufficient to predict defect locations. Obviously, therefore, the embodiments described herein provide significant advantages for training and inference including, but not limited to, performing training much faster and cheaper and without needing defect review type images for labeling the training images.

The advantages of the embodiments described herein are provided by a number of important new features. One such feature is that the embodiments enable neural net based defect filtering and detection methods with no requirement for labeling or annotating every pixel for the AiryNet™ detection or filtering scheme. Another such feature is the ability to select different input channels/images and to select pixels belonging to different regions for training and inference. An additional new feature is the ability to attach multiple models and calculate multiple attributes that can improve separability for different defect types. A further new feature is the ability to train AiryNet™ sequentially with other supervised filtering attribute-based methods using a cross-validation method. The embodiments may also be implemented as part of an existing optical inspector software package for currently used tools or may be implemented in any newly developed inspection tools. The embodiments can be implemented on different kinds of inspection tools as well including, but not limited to, BF and DF tools.

Another embodiment relates to a computer-implemented method for determining information for a specimen location. The method includes inputting one or more images for a specimen location into a region-based neural network configured for performing digital non-linear filtering of the one or more images to thereby generate a filtered image for the specimen location. The method also includes determining information for the specimen location from the filtered image.

Each of the steps of the method may be performed as described further herein. The method may also include any other step(s) that can be performed by the inspection subsystem, computer subsystem, and region-based neural network described herein. In addition, the method described above may be performed by any of the system embodiments described herein.

An additional embodiment relates to a non-transitory computer-readable medium storing program instructions executable on a computer system for performing a computer-implemented method for determining information for a specimen location. One such embodiment is shown in FIG. 8. In particular, as shown in FIG. 8, non-transitory computer-readable medium 800 includes program instructions 802 executable on computer system 804. The computer-implemented method may include any step(s) of any method (s) described herein.

Program instructions 802 implementing methods such as those described herein may be stored on computer-readable medium 800. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes ("MFC"), SSE (Streaming SIMD Extension) or other technologies or methodologies, as desired.

Computer system 804 may be configured according to any of the embodiments described herein.

Further modifications and alternative embodiments of various aspects of the invention will be apparent to those skilled in the art in view of this description. For example, methods and systems for determining information for a specimen location are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain attributes of the invention may be utilized independently, all as would be apparent to one skilled in the art after having the benefit of this description of the invention. Changes may be made in the elements described herein without departing from the spirit and scope of the invention as described in the following claims.

The invention claimed is:

1. A system configured for determining information for a specimen, comprising:

a computer subsystem configured for:

training a region-based neural network configured for performing digital non-linear filtering of images with a training data set comprising training images, wherein only a portion of pixels in each of one or more of the training images are labeled, and wherein not all pixels in said each of the one or more of the training images are labeled;

inputting one or more images for a specimen location into the region-based neural network to thereby generate a filtered image for the specimen location; and determining information for the specimen location from the filtered image.

2. The system of claim 1, wherein the information determined for the specimen from the filtered image comprises defect of interest signal spots and localized signal peaks, and wherein the region-based neural network is further configured to generate the filtered image as a single output image configured as a probability density map allowing the defect of interest signal spots and the localized signal peaks to be identified.

3. The system of claim 1, wherein different regions in the training images are labeled.

4. The system of claim 1, wherein the region-based neural network is further configured for labeling at least one of one or more defect subregions and one or more non-defect subregions in the filtered image.

5. The system of claim 1, wherein at least one defect subregion or at least one non-defect subregion is labeled in each of the training images, and wherein the region-based neural network is further configured for labeling at least one of one or more defect subregions and one or more non-defect subregions in the filtered image.

6. The system of claim 5, wherein determining the information comprises applying a defect detection method to the filtered image.

7. The system of claim 5, wherein determining the information comprises determining one or more attributes of the specimen location from the filtered image and performing nuisance filtering based on the one or more attributes.

8. The system of claim 5, wherein the at least one defect subregion or at least one non-defect subregion in each of the training images are labeled based only on information about at least one location of a defect or a non-defect in at least one different image generated for the specimen.

9. The system of claim 8, wherein the information about the at least one location of the defect or the non-defect is determined from the at least one different image having a different scale than the training images.

10. The system of claim 8, wherein the information about the at least one location of the defect or the non-defect is determined from the at least one different image without aligning the at least one different image to any of the training images.

11. The system of claim 8, wherein the training images and the one or more images input to the region-based neural network are generated by an inspection subsystem, and wherein the at least one different image is generated by a defect review subsystem.

12. The system of claim 1, wherein the region-based neural network is further configured as an all convolutional region-based neural network with multiple input image channels.

13. The system of claim 1, wherein the region-based neural network is further configured with a number of training parameters on the order of 1000 or less.

14. The system of claim 1, wherein the region-based neural network comprises a predetermined, limited number of layers.

15. The system of claim 1, wherein the region-based neural network comprises a predetermined, limited number of stacked digital dilated convolutional filters with dilation factors ranging from 0 up to some predetermined, limited number.

16. The system of claim 1, wherein the computer subsystem is further configured for selecting the one or more images for the specimen location input to the region-based neural network from multiple images available for the specimen location.

17. The system of claim 1, wherein the region-based neural network is trained for a first type of defect of interest, wherein the computer subsystem is further configured for inputting at least one image for the specimen location into an additional region-based neural network configured for performing digital non-linear filtering of the at least one image to thereby generate an additional filtered image for the specimen location, and wherein the additional region-based neural network is trained for a second type of defect of interest.

18. The system of claim 1, wherein the computer subsystem is further configured for said training the region-based neural network and validating the region-based neural network with a cross-validation method.

19. The system of claim 18, wherein an initial stage of the cross-validation method generates cross-validated attributes for the training images, and wherein a subsequent stage of the cross-validation method is performed with the cross-validated attributes in combination with one or more attributes generated by a different supervised attribute-based filtering method.

20. The system of claim 1, wherein the one or more images input to the region-based neural network comprise at least one of a difference image, a reference image, a test image, and a design image for the specimen location.

21. The system of claim 1, wherein the computer subsystem is further configured for said training the region-based neural network with the training data set comprising the training images and labels for one or more defect subregions and one or more non-defect subregions in the training images and applying weights to one or more of the training images and the labels to alter a contribution between positive and negative classes in a cost function used for the training.

22. The system of claim 1, wherein the computer subsystem is further configured for said training the region-based neural network with the training data set comprising the training images and labels for one or more defect subregions and one or more non-defect subregions in the training images and applying weights to one or more of the training images and the labels to alter a contribution between different positive classes in a cost function used for the training.

23. The system of claim 1, wherein the computer subsystem is further configured for said training the region-based neural network with the training data set comprising the training images and labels for one or more defect subregions and one or more non-defect subregions in the training images and applying weights to one or more of the training images and the labels to alter a contribution between different negative classes in a cost function used for the training.

24. The system of claim 1, wherein the computer subsystem is further configured for training multiple models with different combinations of predetermined hyperparameter values, identifying which one of the multiple models produces results with a highest predefined metric, and selecting the identified one of the multiple models as the region-based neural network.

25. The system of claim 1, wherein determining the information comprises applying a defect detection method to the filtered image.

26. The system of claim 1, wherein determining the information comprises applying a defect detection method to the filtered image and at least one other image generated for the specimen location.

27. The system of claim 1, wherein determining the information comprises determining one or more attributes of the specimen location from the filtered image and performing nuisance filtering based on the one or more attributes.

28. The system of claim 1, further comprising an inspection subsystem configured for generating at least one of the one or more images for the specimen location.

29. The system of claim 1, wherein at least one of the one or more images generated for the specimen location is an optical wafer image generated by an inspection subsystem.

30. A non-transitory computer-readable medium, storing program instructions executable on a computer system for performing a computer-implemented method for determining information for a specimen location, wherein the computer-implemented method comprises:

training a region-based neural network configured for performing digital non-linear filtering of images with a training data set comprising training images, wherein only a portion of pixels in each of one or more of the training images are labeled, and wherein not all pixels in said each of the one or more of the training images are labeled;

inputting one or more images for a specimen location into the region-based neural network to thereby generate a filtered image for the specimen location; and determining information for the specimen location from the filtered image.

31. A computer-implemented method for determining information for a specimen location, comprising:

training a region-based neural network configured for performing digital non-linear filtering of images with a training data set comprising training images, wherein only a portion of pixels in each of one or more of the training images are labeled, and wherein not all pixels in said each of the one or more of the training images are labeled;

inputting one or more images for a specimen location into the region-based neural network to thereby generate a filtered image for the specimen location; and determining information for the specimen location from the filtered image, wherein said training, inputting and determining are performed by a computer subsystem.

* * * * *